(12) United States Patent
Bingel et al.

(10) Patent No.: US 7,427,873 B2
(45) Date of Patent: Sep. 23, 2008

(54) SYSTEMS AND METHODS FOR CURRENT MANAGEMENT FOR DIGITAL LOGIC DEVICES

(75) Inventors: Thomas J. Bingel, Indian Rocks Beach, FL (US); Deanne Tran, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 403 days.

(21) Appl. No.: 11/340,285

(22) Filed: Jan. 26, 2006

(65) Prior Publication Data

US 2007/0182599 A1    Aug. 9, 2007

(51) Int. Cl.
*H03K 17/16* (2006.01)
*H03K 19/003* (2006.01)

(52) U.S. Cl. .................. 326/33; 326/27; 327/538; 327/545

(58) Field of Classification Search .................. 326/21, 326/26–27, 31, 33–34; 327/538–545
See application file for complete search history.

(56) References Cited

U.S. PATENT DOCUMENTS 6,040,707 A * 3/2000 Young et al. .................. 326/21
6,967,853 B2 * 11/2005 DeFazio et al. ............... 363/49

* cited by examiner

*Primary Examiner*—Rexford Barnie
*Assistant Examiner*—Jason M Crawford
(74) *Attorney, Agent, or Firm*—Fogg & Powers LLP

(57) ABSTRACT

Systems and methods for Current Management of Digital Logic Devices is provided. In one embodiment, a method of current management for a digital logic circuit is provided. The method comprises drawing power to drive a digital logic integrated circuit; performing one or more switching operations with the digital logic integrated circuit; learning at least one bypass current setpoint based on a voltage powering the digital logic integrated circuit while performing the one or more switching operations.

24 Claims, 7 Drawing Sheets

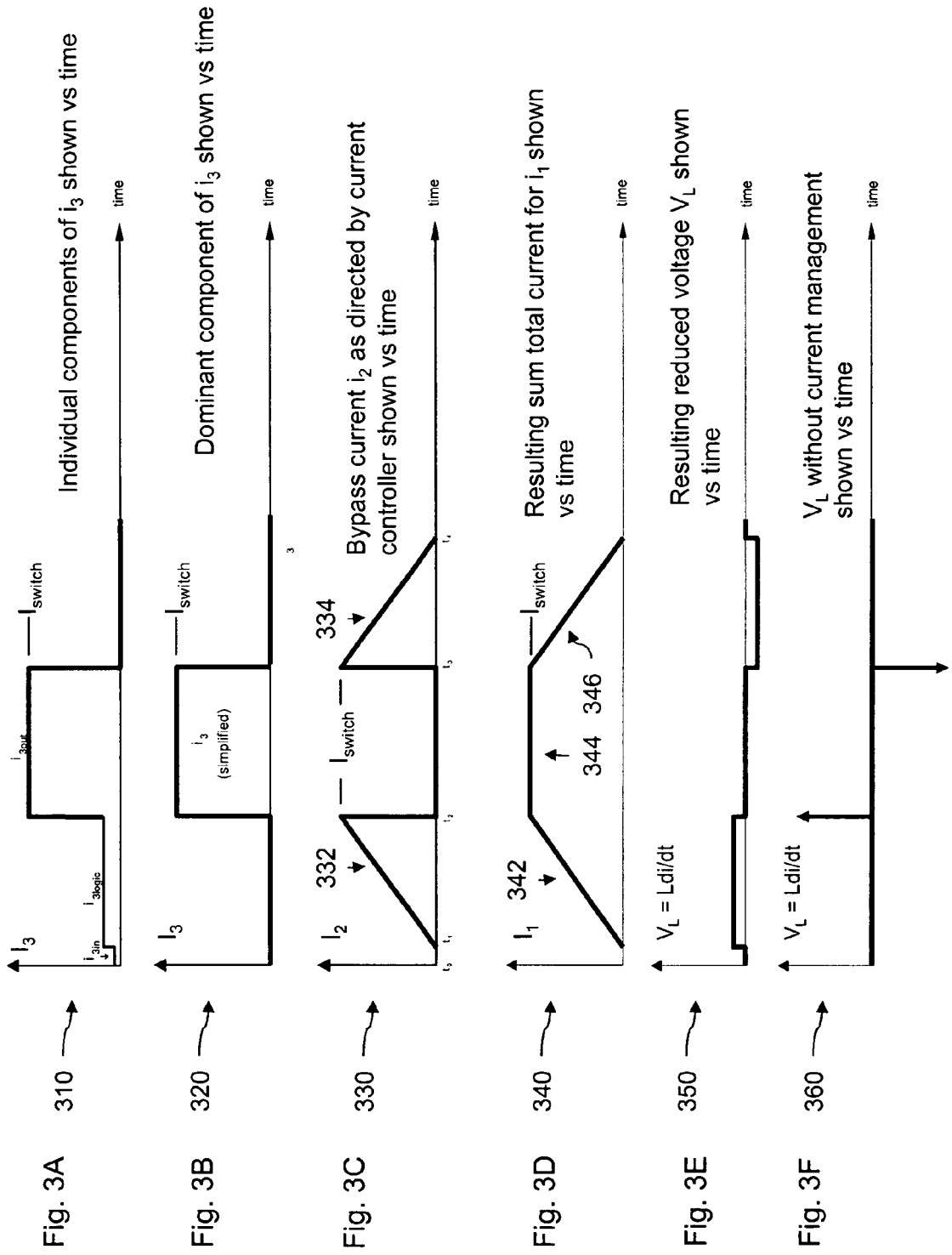

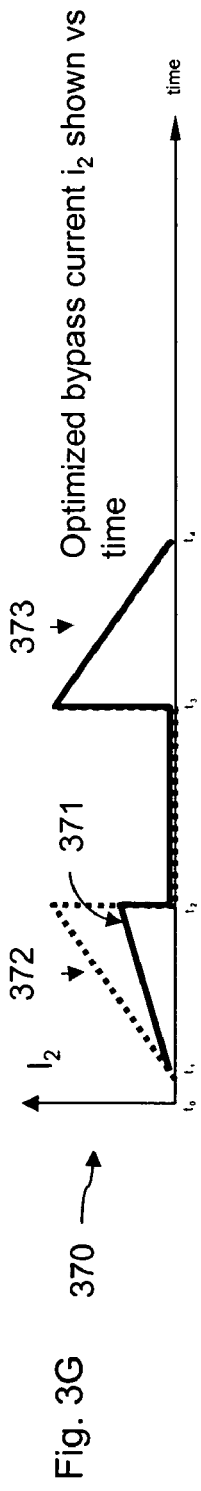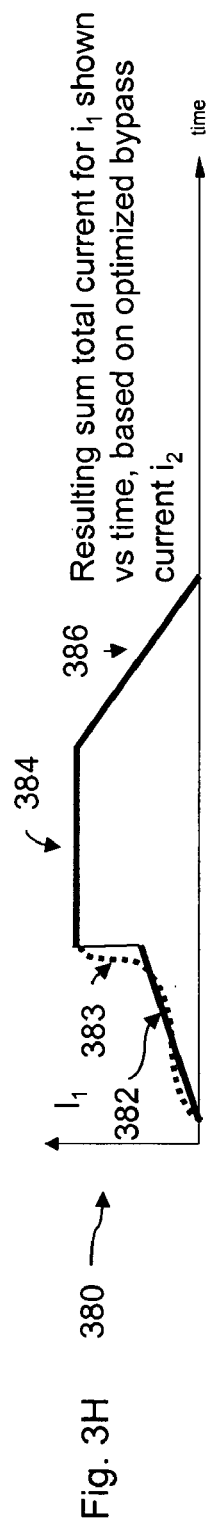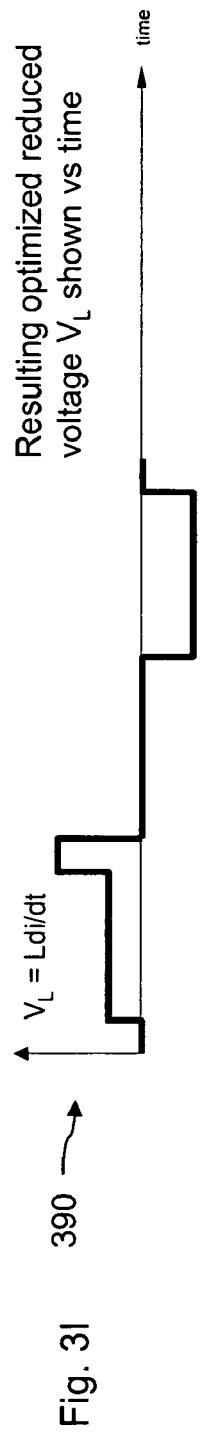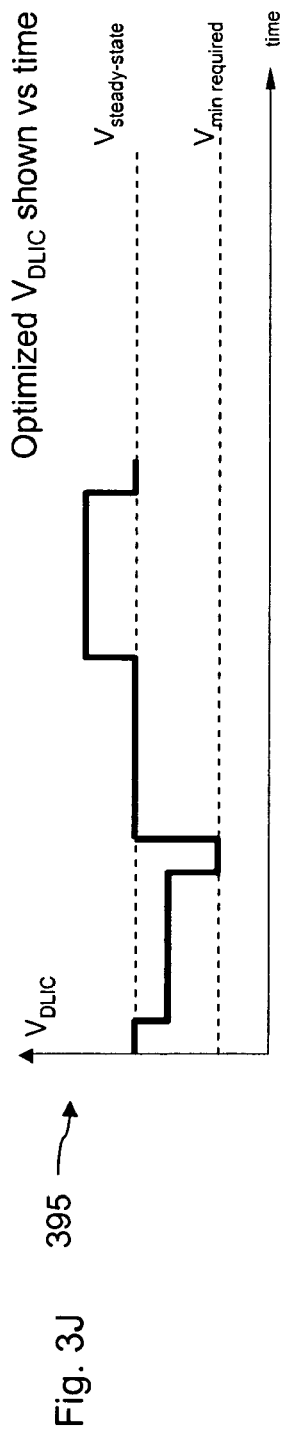
Fig. 3G
Fig. 3H
Fig. 3I
Fig. 3J

US 7,427,873 B2

SYSTEMS AND METHODS FOR CURRENT MANAGEMENT FOR DIGITAL LOGIC DEVICES

CROSS REFERENCES

This application is also related to the following co-pending United States patent applications filed on even data herewith, which are hereby incorporated herein by reference:

U.S. patent application Ser. No. 11/340,245 entitled "Systems and Methods for Current Management for Digital Logic Devices") and which is referred to here as the '949 application; and U.S. patent application Ser. No. 11/340,287 entitled "Testing Control Methods for Use in Current Management Systems for Digital Logic Devices") and which is referred to here as the '090 application.

TECHNICAL FIELD

The present invention generally relates to digital logic circuits and more specifically to current management for digital logic devices.

BACKGROUND

In the current state of the art, digital logic power-supply decoupling is achieved using decoupling capacitors. A digital logic device, due to its discrete nature, switches logic states between on and off. This digital switching causes transient currents to be generated, which must be supplied by the power distribution system. Typically, decoupling capacitors in proximity to the digital logic are used to supply the transient current. However, parasitic inductances are always present between the digital logic and the decoupling capacitor. These inductances react to changes in digital logic device current demand by producing voltages that impede the ability of decoupling capacitors to supply transient current to the digital logic. In simulations, it is apparent that this parasitic inductance is the prime limitation to the success of the decoupling capacitor in achieving its function—that of ensuring the power-supply voltage at the digital logic remains fixed at all times. Little has changed in the past 40 years, except incremental means of reducing the parasitic inductance between digital-logic integrated circuits and decoupling capacitors.

For the reasons stated above and for other reasons stated below which will become apparent to those skilled in the art upon reading and understanding the specification, there is a need in the art for improved systems and methods for current management for digital logic devices.

SUMMARY

The Embodiments of the present invention provide methods and systems for current management and will be understood by reading and studying the following specification.

In one embodiment, a current management system for a digital logic circuit is provided. The system comprises a controllable current sink connected in parallel with a digital logic integrated circuit and adapted to draw a bypass current based on a control signal; and a current controller responsive to the digital logic integrated circuit and adapted to vary the bypass current in response to a priori information about an impending current need of the digital logic integrated circuit, the current controller adapted to output the control signal to the controllable current sink; and wherein the current controller is further adapted to adjust the bypass current to prevent a voltage across the digital logic integrated circuit from dropping below a reference voltage.

In another embodiment, a method of current management for a digital logic circuit is provided. The method comprises drawing power to drive a digital logic integrated circuit; performing one or more switching operations with the digital logic integrated circuit; and learning at least one bypass current setpoint based on a voltage powering the digital logic integrated circuit while performing the one or more switching operations.

In yet another embodiment, a current management system for a digital logic integrated circuit is provided. The system comprises means for controlling a bypass current, the means for controlling adapted to control the bypass current based on a priori information about an impending current need of a digital logic integrated circuit, wherein the bypass current is controlled to reduce discontinuities in a current supplied to the digital logic integrated circuit; means for drawing the bypass current, the means for drawing the bypass current connected electrically in parallel with the digital logic integrated circuit and responsive to the means for controlling; and means for limiting the bypass current to prevent a voltage powering the digital logic integrated circuit from dropping below a reference voltage, the means for limiting responsive to the means for controlling.

DRAWINGS

Embodiments of the present invention can be more easily understood and further advantages and uses thereof more readily apparent, when considered in view of the description of the preferred embodiments and the following figures in which.

Figure 4:
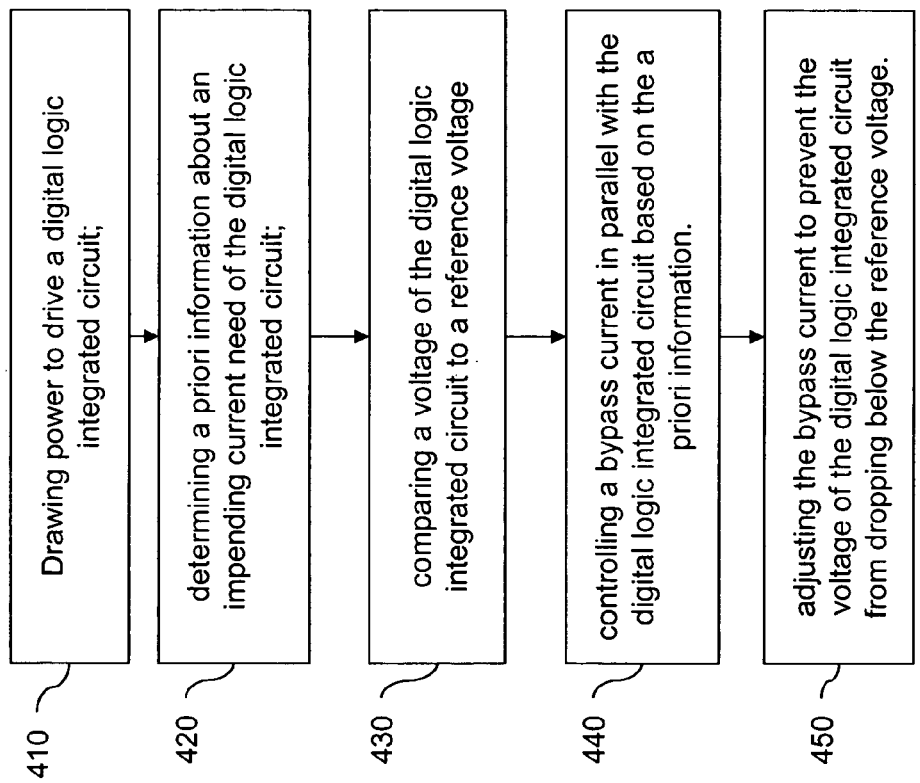
Figure 5:
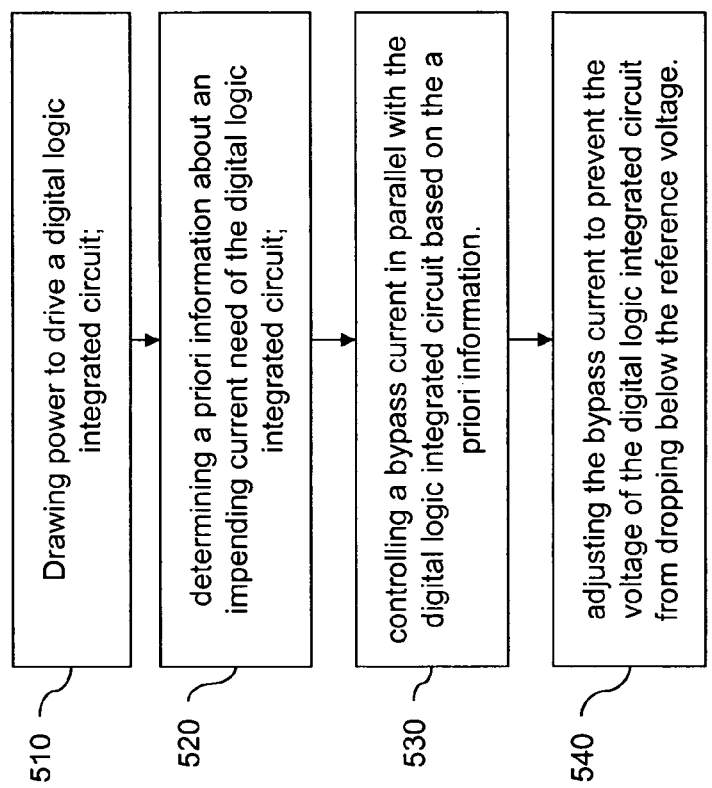

FIGS. 3A-3F provide a series of charts illustrating current magnitudes and voltages within a current management system of one embodiment of the present invention;

FIGS. 3G-3J provide a series of charts illustrating optimized current magnitudes and voltages within a current management system of one embodiment of the present invention;

FIG. 4 is a flow chart illustrating a method of one embodiment of the present invention; and FIG. 5 is a flow chart illustrating a method of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide methods and systems for current management for digital logic devices. Embodiments of the present invention comprise systems and methods of reducing current demand variations on digital logic power supplies caused by digital logic switching, and thereby reduce impediments caused by parasitic inductance. Because the voltage developed across a parasitic inductance is equal to L times the change in current with respect to time, and the parasitic inductance is generally minimized, but never zero, embodiments of the present invention use: 1) a priori information about the impending current needs, and 2) current management circuitry to operate in parallel with the digital logic circuitry. The a priori information is used to ramp up or down the power supply current in advance of a digital-logic switching event to reduce di/dt, and thus reduce the transient parasitic voltage drop in the power supply system that would normally result.

Figure 1A:
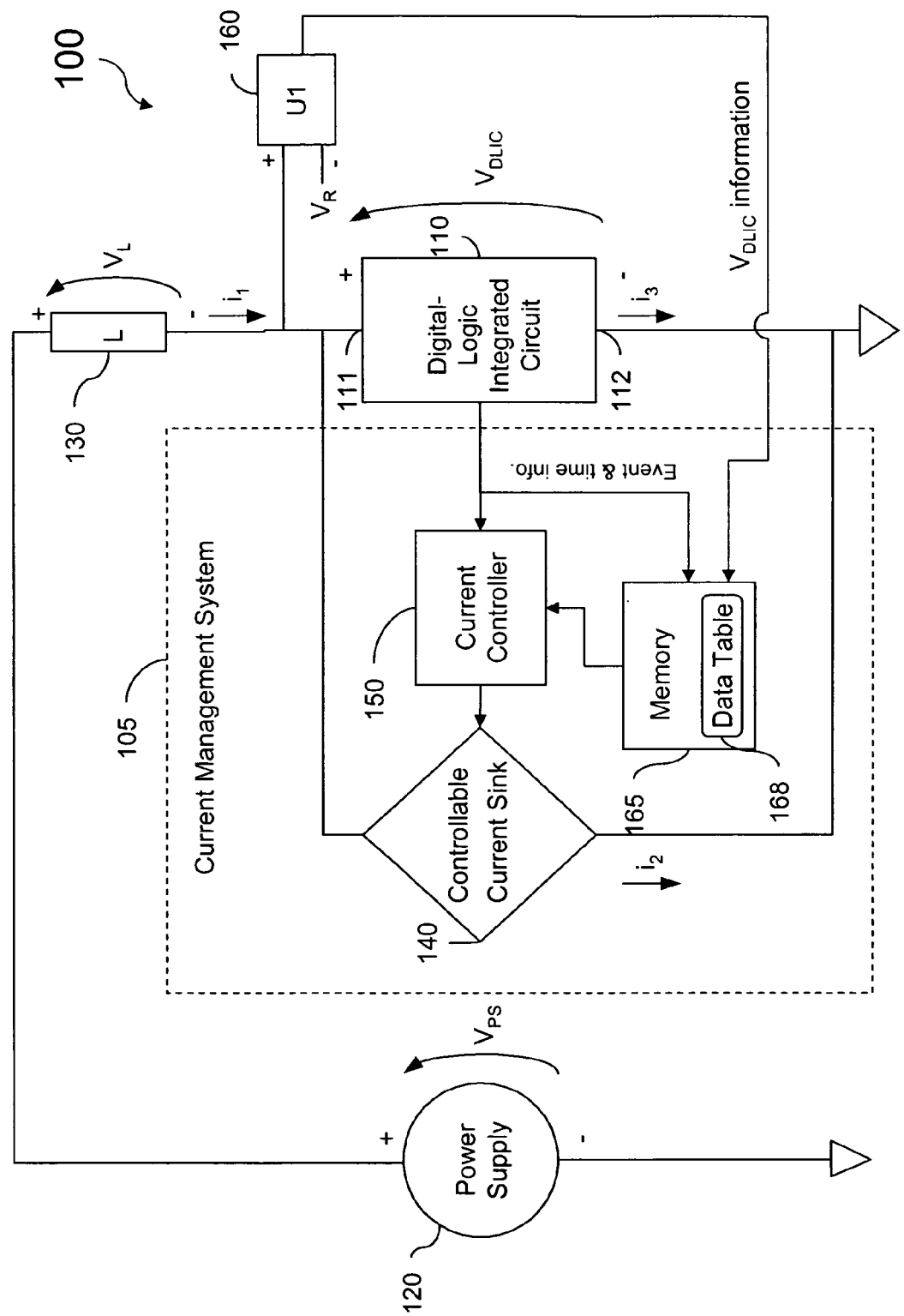
FIGS. 1A and 1B are block diagrams illustrating a current management system of one embodiment of the present invention.

FIG. 1 is a block diagram illustrating a system 100 for managing current, of one embodiment of the present invention. System 100 comprises a digital logic integrated circuit 110 coupled to receive power ($V_{ps}$) from a digital logic power supply 120. In one embodiment, digital logic integrated circuit 110 is a small-scale integrated circuit (SSI) comprising gates that perform simple functions such as, but not limited to, AND, NAND, OR, NOR and INVERTER. In alternate embodiments, digital logic integrated circuit 110 comprises a high performance processor, such as, but not limited to, a microprocessor, and a digital signal processor. System 100 further comprises a current management system 105. In one embodiment, current management system 105 includes a controllable current sink 140 and a current controller 150. Controllable current sink 140 is coupled in parallel with power connections 111 and 112 of digital logic integrated circuit 110 as shown. Controllable current sink 140 is further coupled to receive a control signal from a current controller 150, which in one embodiment is coupled to digital logic integrated circuit 110.

In operation, when digital logic integrated circuit 110 performs a logic switching operation, the change in current demand ($i_3$) of digital logic integrated circuit 110 is approximated by a step response, as illustrated generally by FIG. 3B at 320. In the absence of current management system 105, parasitic inductances 130 between digital logic integrated circuit 110 and power supply 120 respond to such an abrupt change in current by generating a voltage response ($V_L$=L$di_1$/dt) as illustrated by FIG. 3F at 360. The generation of $V_L$ in between power supply 120 and digital logic integrated circuit 110 causes fluctuations in the voltage ($V_{DLIC}$) available to power digital logic integrated circuit 110.

Current management system 105 mitigates and limits the voltage $V_L$ generated by parasitic inductances 130. In one embodiment, as described in detail by the '949 application herein incorporated by reference, prior to the digital logic integrated circuit 110 switching operation, controllable current sink 140 of current management system 105 ramps a bypass current ($i_2$) up to an expected switching value $I_{switch}$ (shown in FIG. 3C at 332). Then, after the digital logic integrated circuit 110 switching operation, controllable current sink 140 ramps bypass current $i_2$ from $I_{switch}$ back to a steady state level (shown in FIG. 3C at 334). The resulting current ($i_1$=$i_2$+$i_3$) from power supply 120, shown generally in FIG. 3D at 340, comprises a first ramp 342, a plateau 344 and a second ramp 346. As would be appreciated by one skilled in the art upon reading this invention, the absence of abrupt current discontinuities in $i_1$ results in the generation of a transient parasitic voltage $V_L$ (shown in FIG. 3E at 350) that is significantly reduced compared to the spiking transient parasitic voltage $V_L$ (shown in FIG. 3F at 360) that would be produced by $i_3$ alone. Thus, the voltage ($V_{DLIC}$) available to power digital logic integrated circuit 110 is consistently maintained within specification limits throughout the switching operation.

In one embodiment, controllable current sink 140 determines when to ramp up and ramp down bypass current $i_2$ via a control signal provided by current controller 150. Current controller 150 outputs a control signal that is based on a priori information about the impending current needs of digital logic integrated circuit 110. The a priori information can be obtained in a number of ways as described in the '949 application herein incorporated by reference.

In one embodiment of the present invention, in order to determine a maximum current for bypass current $i_2$, system 100 observes the voltage drop in $V_{DLIC}$ that occurs during switching operations by digital logic integrated circuit 110. In one embodiment, system 100 further comprises a voltage monitor (U1) 160. In one embodiment, voltage monitor 160 comprises a comparator device having a non-inverting input connected to power terminal 111 of digital logic integrated circuit 110, and an inverting input connected to a reference voltage $V_R$. In one embodiment, the value of $V_R$ is based on a minimum voltage rating ($V_{min\ required}$) for digital logic integrated circuit 110, below which operation of digital logic integrated circuit 110 is not guaranteed. For many applications, a typical value for $V_R$ is 4.5 VDC. In an alternate embodiment, voltage monitor (U1) 160 comprises an analog to digital converter that converts a voltage measured at power terminal 111 to a digital signal. Note that, when using a comparator device for voltage monitor 160, $V_R$ need not be fixed, but in an alternate embodiment, $V_R$ is set to differing voltages to provide more detailed information. Similarly, in one embodiment, when voltage monitor 160 comprises an analog to digital converter, a high-speed analog-to-digital converter is utilized in lieu of a comparator circuit. In both cases, the detailed information captured and stored as discussed below is utilized to minimize the change in $V_{DLIC}$ during digital logic integrated circuit 110 operation.

In one embodiment, optimum operation of current management system 105 is obtained by ramping $i_2$ to a current level that allows $V_{DLIC}$ to drop to exactly $V_{min\ required}$ (i.e., digital logic integrated circuit 110's minimum required operating voltage). This optimized approach (illustrated by FIGS. 3G to 3J) consumes less power (i.e., the integral of $I_2*V_{DLIC}$ over time) than when controlling bypass current $i_2$ based strictly on reducing transient parasitic voltage $V_L$. In one embodiment, when current controller 150 ramps bypass current $i_2$ in response to a priori information of a logic switching operation by digital logic integrated circuit 110, bypass current $i_2$ is limited to maintain $V_{DLIC}$ at or above $V_{min\ required}$. In one embodiment, to reduce power consumption, the present invention adjusts one of the peak value of bypass current $i_2$, the ramp rate of bypass current $i_2$, and a transition time (e.g., starting at time $t_1$ and finishing at time $t_2$ as shown by example in FIG. 3G) for ramping bypass current $i_2$, while allowing $V_{DLIC}$ to drop all the way to $V_{min\ required}$.

FIG. 3G (generally at 370) illustrates an optimized bypass current $i_2$ (shown at 371) controlled by current controller 150 to have a reduced peak current and slope when compared to a non-optimized bypass current $i_2$ (illustrated at 372). The resulting current ($i_1$=$i_2$+$i_3$) from power supply 120 shown generally in FIG. 3H at 380, comprises a first ramp 382, a plateau 384 and a second ramp 386. The transient parasitic voltage $V_L$ resulting from power supply 120 current transients is illustrated generally by FIG. 3I at 390 and the corresponding optimized transient response of $V_{DLIC}$ by FIG. 3J at 395.

Reducing the peak voltage of bypass current $i_2$ and allowing $V_{DLIC}$ to drop to exactly $V_{min\ required}$ by controlling the ramp rate of bypass current $i_2$, as digital logic integrated circuit 110 initiates a logic switching operation, thus reduces the total power that must be supplied by power supply 120 compared to non-optimized current management approaches. Note that for clarity of explanation in FIGS. 3A to 3J, all increasing and decreasing current ramps for bypass current $i_2$ are shown linearly increasing or linearly decreasing, with abrupt turn-on and turn-off at the beginning and end of the current ramps. Also, shown for clarity, $i_3$ is shown as a simplified pulse in FIG. 3B. However, one skilled in the art upon reading this specification would appreciate that $i_3$ will typically not be an ideal current pulse, and bypass current $i_2$ will typically be realized by gradual and generally non-linear increasing and decreasing current ramps, such that the sum of $i_2+i_3$ yields a low $di_1/dt$. Gradual and generally non-linear adjustments of bypass current $i_2$ reduce voltage change in $V_{DLIC}$ during digital logic operation.

The intended sequence of operation of system 100 includes two phases: a test phase, and a normal operation phase. During the first, or "test" phase, a test routine is executed to capture event data (i.e., event and timing data from digital logic integrated circuit 110 and $V_{DLIC}$ data from voltage monitor 160) and generate time duration and bypass current $i_2$ data which is stored in data table 168 of memory 165.

Figure 1B:
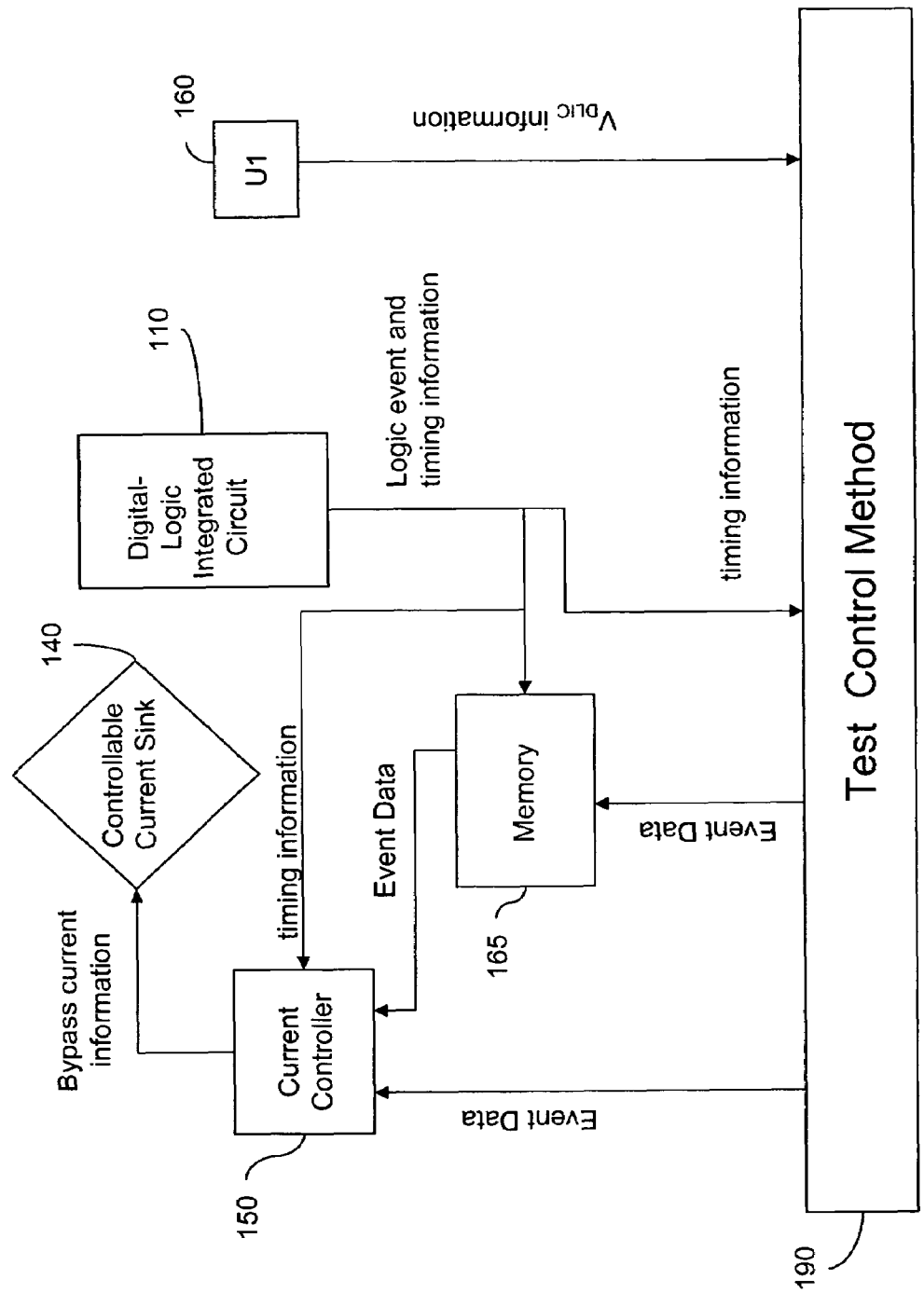

FIG. 1B provides a block diagram illustrating the flow of information within system 100 of one embodiment of the present invention. A test control method 190 (such as the test routines describe in the '090 Application herein incorporated by reference) collects $V_{DLIC}$ information from voltage monitor 160. In one embodiment, the $V_{DLIC}$ information includes samples of the voltage, $V_{DLIC}$ powering digital logic integrated circuit 110. In one embodiment, the $V_{DLIC}$ information represents the difference between $V_{DLIC}$ and reference voltage $V_R$. Test control method 190 further collects event timing information from digital logic integrated circuit 110. The timing information provides information as to when a logic event is executed by digital logic integrated circuit 110. By pairing timing information received from digital logic integrated circuit 110 and $V_{DLIC}$ information from voltage monitor 160, test control method 190 can correlate the $V_{DLIC}$ information associated with logic events. Test control method 190 provides event data obtained to one or both of current controller 150 and memory 165 to enable current controller 150 to control controllable current sink 140 and establish the desired bypass current $i_2$ characteristics during the test phase discussed below. As described below, event data includes information such as the identity of logic events, $V_{DLIC}$ information associated with logic events, and bypass current $i_2$ characteristics associated with logic events. Then in one embodiment during the normal operation phase, when test control method 190 is no longer present, digital logic integrated circuit 110 provides one or both of logic event and timing information to enable current controller 150 to control controllable current sink 140 and establish the desired bypass current $i_2$ characteristics by accessing the event data stored in memory 165 during the test phase. Additional details regarding the test routine executed by digital logic integrated circuit 110 are described below and in the '090 Application herein incorporated by reference. In one embodiment, this test data is stored to correlate an event identifier, ramp duration time (e.g. $t_1$, $t_2$), and peak bypass current $i_2$. In one embodiment, feedback from voltage monitor 160 is applied to reduce power consumption by minimizing $i_2$ peak current and/or $i_2$ transition time by allowing $V_{DLIC}$ to drop exactly (within practical limits) to $V_{min\ required}$, the DLIC's minimum guaranteed operating voltage.

During the second, or "normal operation" phase, one or more of event, time and $V_{DLIC}$ data obtained from the test phase and stored in data table 168 is used for input to the current controller 150, which in turn, controls controllable current sink 140 producing the appropriate bypass current $i_2$ immediately preceding and following the execution of a digital logic operation event. Since, during the test phase, data stored in data table 168 produced an optimized $V_{DLIC}$, digital logic integrated circuit 110 will operate with voltage meeting or exceeding $V_{min\ required}$ with minimal power consumption. Note the inclusion of voltage monitor 160 in system 100 is not necessary while operating in the normal operation phase, but could be used for monitoring purposes. For example, in one embodiment, if while in the normal operation phase, $V_{DLIC}$ dropped bellow $V_{min\ required}$ then digital logic integrated circuit 110 one or both of sets an alarm flag and executes the test phase test routine.

In one embodiment, where the voltage drop in $V_{DLIC}$ across digital logic integrated circuit 110 is fairly consistent over time for a wide range of possible switching operations, current controller 150 is initially calibrated during the test phase to establish a single bypass current setpoint based on the received output of voltage monitor 160. In one embodiment, the bypass current setpoint specifies one or more characteristics of bypass current $i_2$ including one or more of the peak current for bypass current $i_2$, the ramp rate for bringing bypass current $i_2$ to the peak current level, and the transition time for bringing bypass current $i_2$ to the peak current level. In one embodiment, during the test phase, digital logic integrated circuit 110 performs one or more switching operations while the test data output of voltage monitor 160 is stored in data table 168. In one embodiment, based on the test data output of voltage monitor 160 during the one or more switching operations, current controller 150 determines bypass current $i_2$ characteristics that will produce a $V_{DLIC}$ at or above $V_R$, for all of the one or more switching operations and established the bypass current setpoint based on those bypass current $i_2$ characteristics. In one embodiment, the bypass current setpoint is stored by current management system 105 in a memory 165. In one embodiment, after calibrating current controller 150 with the bypass current setpoint, current controller 150 shifts to the normal operation phase. In the normal operation phase, current controller 150 ramps bypass current $i_2$ from steady state to the bypass current setpoint as described above, in response to the a priori information. After the switching operation is completed, current controller 150 ramps bypass current $i_2$ from ramping the bypass current from expected switching value $I_{switch}$ back to a steady state value (as shown in FIG. 3G at 373). Because while in normal operation phase, current management system 105 controls bypass current $i_2$ based on the bypass current setpoint rather than dynamic measurements of $V_{DLIC}$, feedback from voltage monitor 160 is not required.

In other embodiments, the voltage drop in $V_{DLIC}$ across digital logic integrated circuit 110 will vary, increasing with the complexity of the synchronous logic path required for digital logic integrated circuit 10 to execute one or more logic functions. A more complex synchronous logic path within digital logic integrated circuit 110 generally requires more bypass current setpoints, some of which may draw a relatively larger current $i_3$ than a less complex synchronous logic path. Accordingly, in one embodiment, current controller 150 is calibrated to establish an associated bypass current setpoint for each of the one or more logic functions performed by digital logic integrated circuit 110.

In one embodiment, when in the test phase, changes in $V_{DLIC}$ are observed by voltage monitor 160 and stored as test data in data table 160 while digital logic integrated circuit 110 executes the one or more logic functions. For each of the one or more logic functions, current controller 150 determines bypass current $i_2$ characteristics such that $V_{DLIC}$ is maintained at or above $V_R$, and sets an associated bypass current setpoint based on those bypass current $i_2$ characteristics. In one embodiment, the associated bypass current setpoint specifies one or more characteristics of bypass current $i_2$ including one or more of the peak current for bypass current $i_2$, the ramp rate for bringing bypass current $i_2$ to the peak current level, and the transition time for bringing bypass current $i_2$ to the peak current level. In one embodiment, to obtain optimum operation of current management system 105, current controller 150 determines associated bypass current setpoint that allows $V_{DLIC}$ to drop to exactly $V_R$ for each of the one or more logic functions, as described with respect to FIGS. 3G to 3J above.

In one embodiment current management system 105 stores the bypass current setpoint values acquired during test phase testing in data table 168. Data table 168 is configured to correlate an associated bypass current setpoint with each of the one or more logic functions executed by digital logic integrated circuit 110. In one embodiment, bypass current setpoints for the one or more logic functions executed by digital logic integrated circuit 110 are acquired by performing one or more test methods for acquiring test data as described in the '090 Application herein incorporated by reference.

In one embodiment, after calibration is complete, current management system 105 shifts from the test phase to the normal operation phase. In the normal operation phase, current controller 150 ramps bypass current $i_2$ based on a bypass current setpoint as described above, in response to a prior information about the impending current needs of digital logic integrated circuit 110. In one embodiment, current controller 150 receives a priori information that identifies which of the one or more logic functions will be executed by digital logic integrated circuit 110, and based on the a priori information, selects an associated bypass current setpoint based on the one or more bypass current setpoints in data table 168. The a priori information can be obtained in a number of ways as described in the '949 Application herein incorporated by reference. In one embodiment, digital logic integrated circuit 110 communicates to current controller 150 the a priori information that identifies which of the one or more logic functions will be executed by digital logic integrated circuit 110. After the switching operation is completed, current controller 150 ramps bypass current $i_2$ from ramping the bypass current from expected switching value $I_{switch}$ back to a steady state value (as shown in FIG. 3G at 373).

Figure 2:
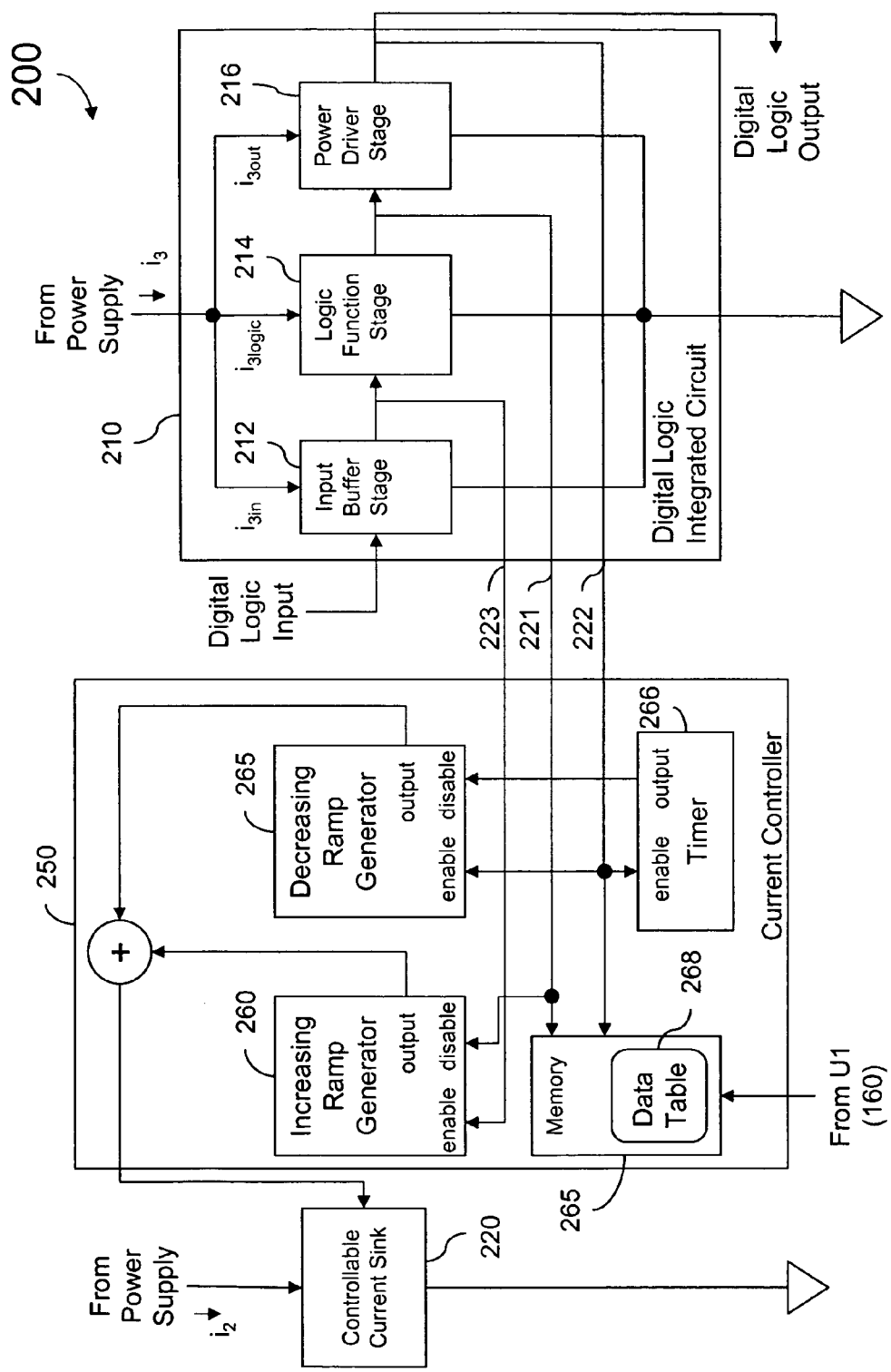
FIG. 2 is a block diagram illustrating a current management system of one embodiment of the present invention.

One such means for obtaining a priori information identifying which of the one or more logic functions will be executed by digital logic integrated circuit 110 is illustrated by FIG. 2. FIG. 2 illustrates a system 200 for communicating a priori switching information between a current controller 250 and a digital logic integrated circuit 210 of one embodiment of the present invention. In one embodiment, current controller 250 comprise an increasing ramp generator 260 adapted to output a control signal to a controllable current sink 220 to ramp bypass current $i_2$ from a steady state value (e.g. zero amps) to a bypass current setpoint. In one embodiment, current controller 250 also comprises a decreasing ramp generator 265 adapted to output a control signal to the controllable current sink 220 that ramps bypass current $i_2$ from the bypass current setpoint back to the steady state value (e.g. zero amps).

In one embodiment, the digital logic integrated circuit 210 comprises an input buffer stage 212, a logic function stage 214, and a power driver stage 216 as described in the '949 Application herein incorporated by reference. During operation of digital logic integrated circuit 210, data from digital logic input signals are stored within input buffer stage 212. The data is then transferred to logic function stage 214, where one or more operations (e.g., NAND, NOR) are performed based on the function of digital logic integrated circuit 210. When logic function stage 214 is ready to output data, the data is transferred to the power driver stage 216 for output. The contribution of each of input buffer stage 212, logic function stage 214, and power driver stage 216 to the total current draw $i_3$ of digital logic integrated circuit 210 is illustrated by FIG. 3A at 310 by $i_{3in}$, $i_{3logic}$, and $i_{3out}$, respectively. In one embodiment, upon receiving digital logic input data at time $t_1$, input buffer stage 212 enables increasing ramp generator 260 to ramp bypass current $i_2$ to the bypass current setpoint via signal 223. Logic function stage 214 then disables (via signal 221) the output of increasing ramp generator 260 at time $t_2$, which is when $i_3$ steps to $I_{switch}$ to support the switching operations of digital logic integrated circuit 210. Signal 222 from power driver stage 216 then enables decreasing ramp generator 260 at time $t_3$, which is when $i_3$ steps from $I_{switch}$ back to its steady state value. At time $t_3$, decreasing ramp generator 260 begins to ramp bypass current $i_2$ back to steady state starting from the bypass current setpoint. In one embodiment, a timer 266 is also enabled at time $t_3$ by power driver stage 216. At time $t_4$, an output signal from timer 266 disables the output of decreasing ramp generator 265. In one embodiment, the sum of the outputs from increasing ramp generator 260 and decreasing ramp generator comprise the control signal provided to controllable current sink 220 from current controller 250.

In one embodiment, current controller 250 is configured to ramp bypass current $i_2$ to (and from) a selected peak current level based on a single bypass current setpoint stored in memory 265. In an alternate embodiment, current controller 250 is configured to ramp bypass current $i_2$ to, and from, one of a plurality of bypass current setpoints stored in data table 268, based on the logic operation to be performed by logic function stage 214. In one embodiment, logic function stage 214 (via signal 221) identifies to current controller 250 the logic operation to be performed by logic function stage 214 and current controller 250 correlates the logic operation with an associated bypass current setpoint stored in memory 265. In one embodiment, logic function stage 214 identifies to current controller 250 the pending operation and current controller 250 determines the associated bypass current setpoint by correlating the identified pending operation with test data stored in data table 268. The output of increasing ramp generator 260 is then disabled once bypass current $i_2$ reaches the associated bypass current setpoint. In one embodiment, data for data table 268, correlating the one or more operations performed by digital logic integrated circuit 210 with one or more corresponding bypass current setpoints, is acquired as described in the '090 Application herein incorporated by reference. In one embodiment, one or both of increasing ramp generator 260 and decreasing ramp generator 265 vary their ramp rate based on the value of the bypass current setpoint. For example, in one embodiment, increasing ramp generator 260 ramps bypass current $i_2$ at a relatively faster rate for larger bypass current setpoints than for smaller bypass current setpoints, to ensure that the bypass current $i_2$ reaches the selected peak current level when digital logic integrated circuit 210's current demand $i_3$ increases to switching value $I_{switch}$ (i.e., at time $t_2$ as shown in FIG. 3C at 332). Note that for clarity of explanation in FIGS. 3A to 3J, all increasing and decreasing current ramps for bypass current $i_2$ are shown linearly increasing or linearly decreasing, with abrupt turn-on and turn-off at the beginning and end of the current ramps. (A non-linear representation of one potential resulting current $i_1$ is shown generally at 383). Also, shown for clarity, $i_3$ is shown as a simplified pulse in FIG. 3A. However, one skilled in the art upon reading this specification would appreciate that $i_3$ will typically not be an ideal current pulse, and bypass current $i_2$ will typically be realized by gradual and generally non-linear increasing and decreasing current ramps, such that the sum of $i_2+i_3$ yields a low $di_1/dt$. Gradual and generally non-linear adjustments of bypass current $i_2$ reduce voltage change in $V_{DLIC}$ during digital logic operation.

FIG. 4 is a flow chart illustrating a method of current management for a digital logic circuit. In one embodiment, FIG. 4 illustrates a method for operation of a current management in a test phase as described above. In one embodiment, the method may be used for calibrating a current management system for a digital logic circuit as described in the '949 Application herein incorporated by reference. The method begins at 410 and comprises drawing power to drive a digital logic integrated circuit. The method further comprises determining a priori information about an impending current need of the digital logic integrated circuit at 420. In one embodiment, the a priori information is received from a signal from the digital logic integrated circuit. In one embodiment, the a priori information includes information about which of one or more logic functions will be executed by the digital logic integrated circuit.

In one embodiment, at 430, the method also comprises observing a voltage, $V_{DLIC}$, across the digital logic integrated circuit. In one embodiment, $V_{DLI}$ is compared to a reference voltage $V_R$. In one embodiment, the reference voltage $V_R$ represents $V_{min\ required}$, a minimum $V_{DLIC}$ voltage rating for the digital logic integrated circuit, below which operation of the digital logic integrated circuit cannot be guaranteed. For many applications, a typical value for $V_R$ is 4.5 VDC.

The method continues at 440 with controlling a bypass current in parallel with the digital logic integrated circuit based on the a priori information, wherein the bypass current is controlled to reduce discontinuities in the current supplied by a power supply. The method adjusts the bypass current at 450 to prevent the voltage of the digital logic integrated circuit from dropping below the reference voltage. In one embodiment, adjusting the bypass current includes controlling one or more of the peak current for bypass current $i_2$, the ramp rate for bringing bypass current $i_2$ to the peak current level, and the transition time for bringing bypass current $i_2$ to the peak current level.

As discussed above, the voltage drop in $V_{DLIC}$ across the digital logic integrated circuit is a function of both the current $i_3$ drawn by the digital logic integrated circuit when performing logic switching operations and the bypass current. By adjusting the bypass current to maintain $V_{DLIC}$ greater than or equal to $V_{min\ required}$, fluctuations in $V_{DLIC}$ due to parasitic inductances are reduced without allowing $V_{DLIC}$ to drop to a level that could cause the digital logic integrated circuit to malfunction. In one embodiment, the method optionally comprises executing one or more logic functions within the digital logic integrated circuit and determining a bypass current setpoint based on the difference between the voltage of the digital logic integrated circuit and the reference voltage. In one embodiment, the bypass current setpoint is stored in a memory. In one embodiment, the bypass current setpoint is determined as described in the '090 Application herein incorporated by reference.

In one embodiment, the degree of voltage drop in $V_{DLIC}$ varies, increasing with the complexity of the synchronous logic path required for the digital logic integrated circuit to execute one or more logic functions, and the resulting $i_3$ current required to perform associated logic switching operations. Accordingly, in one embodiment, the method optionally comprises executing one or more logic functions with the digital logic integrated circuit and determining an associated bypass current setpoint for each of the one or more logic functions. In one embodiment, each bypass current setpoint is based on the difference between the voltage of the digital logic integrated circuit and a reference voltage while executing the associated logic function of the one or more logic functions. The associated bypass current setpoints and logic function can then be correlated within a data table for later access. In this way, the current controller essentially learns a bypass current setpoint specifying characteristics including one or more of a peak current, a ramp rate, and a transition time for each of the logic functions. In one embodiment, the data table is stored in memory. In one embodiment, the associated bypass current setpoints are determined as described in the '090 Application herein incorporated by reference.

In one embodiment, FIG. 5 illustrates a method for operation of a current management in a normal operation phase as described above. In one embodiment, when one or more bypass current setpoints are established using the method of FIG. 4, current management for the digital logic circuit is achieved by the method illustrated in FIG. 5. The method starts at 510 with drawing power to drive a digital logic integrated circuit. The method continues at 520 with determining a priori information about an impending current need of the digital logic integrated circuit. In one embodiment, the a priori information is received from a signal from the digital logic integrated circuit. In one embodiment, the a priori information includes information about which of one or more logic functions will be executed by the digital logic integrated circuit. The method continues at 530 with controlling a bypass current in parallel with the digital logic integrated circuit based on the a priori information and at 540 with adjusting the bypass current to prevent the voltage of the digital logic integrated circuit from dropping below $V_{min\ required}$. In one embodiment, the bypass current is controlled to reduce discontinuities in the current supplied by a power supply. In one embodiment, controlling a bypass current further comprises ramping the bypass current based on a bypass current setpoint established during calibration, and when the impending current need of the digital logic integrated circuit is completed, ramping the bypass current from $I_{switch}$ back to a steady state value. In one embodiment, the bypass current setpoint is established by referring to a data table to look up the logic function identified by the a priori information, and correlate the logic function with an associated bypass current setpoint. In one embodiment, the associated bypass current setpoint specifies one or more characteristics of the bypass current including one or more of the peak current for bypass current, the ramp rate for bringing bypass current to the peak current level, and the transition time for bringing bypass current to the peak current level.

Several means are available to implement the controllable current sink, current controller, and digital logic integrated circuit discussed above. These means include, but are not limited to, digital computer systems, programmable controllers, or field programmable gate arrays. Therefore other embodiments of the present invention are program instructions resident on computer readable media which when implemented by such processors, enable the processors to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A current management system for a digital logic circuit, the system comprising:
   a controllable current sink connected in parallel with a digital logic integrated circuit and adapted to draw a bypass current based on a control signal; and
   a current controller responsive to the digital logic integrated circuit and adapted to vary the bypass current in response to a priori information about an impending current need of the digital logic integrated circuit, the current controller adapted to output the control signal to the controllable current sink; and
   wherein the current controller is further adapted to adjust the bypass current to prevent a voltage across the digital logic integrated circuit from dropping below a reference voltage.

2. The system of claim 1, further comprising:
   a voltage monitor coupled to the digital logic integrated circuit and adapted to output a signal representing the voltage across the digital logic integrated circuit; and
   a memory adapted to store test data based on the signal representing the voltage across the digital logic integrated circuit; and
   wherein the current controller is further adapted to adjust the bypass current to prevent a voltage across the digital logic integrated circuit from dropping below a reference voltage based on the test data.

3. The system of claim 1, the current controller further comprising one or both of:
   a first ramp generator adapted to cause the controllable current sink to ramp the bypass current to a bypass current setpoint; and
   a second ramp generator adapted to cause the controllable current sink to ramp the bypass current from an expected switching value to a steady state level.

4. The system of claim 1, the current controller further comprising:
   a memory including one or more bypass current setpoints, wherein the current controller is further adapted to limit the bypass current based on the one or more bypass current setpoints.

5. The system of claim 4, wherein the current controller is adapted to learn the one or more bypass current setpoints based on observations of the voltage across the digital logic integrated circuit acquired while executing one or more logic functions with the digital logic integrated circuit.

6. The system of claim 4, wherein the current controller is further adapted to vary the bypass current in response to a priori information comprising which of one or more logic functions will be executed by the digital logic integrated circuit.

7. The system of claim 4, wherein the one or more bypass current setpoints include one or more of a peak current, a ramp rate, and a transition time.

8. A method of current management for a digital logic circuit, the method comprising:
   drawing power to drive a digital logic integrated circuit;
   performing one or more switching operations with the digital logic integrated circuit; and
   learning at least one bypass current setpoint based on a voltage powering the digital logic integrated circuit while performing the one or more switching operations.

9. The method of claim 8, wherein learning at least one bypass current setpoint includes learning one or more of a peak current, a ramp rate, and a transition time.

10. The method of claim 8, wherein learning at least one bypass current further comprises:
    comparing the voltage powering the digital logic integrated circuit to a reference voltage.

11. The method of claim 10, wherein comparing the voltage powering the digital logic integrated circuit to a reference voltage further comprises converting the voltage from an analog signal into a digital signal.

12. The method of claim 8, further comprising:
    storing the at least one bypass current setpoint in a memory.

13. The method of claim 8, wherein learning at least one bypass current further comprises:
    executing a plurality of logic functions with the digital logic integrated circuit;
    monitoring the voltage powering the digital logic integrated circuit; and
    learning a first bypass current setpoint of a plurality of bypass current setpoints based on the difference between the monitored voltage a reference voltage while executing a first logic function of the one or more logic functions.

14. The method of claim 13, further comprising:
    correlating each of the plurality of logic functions with an associated bypass current setpoint of the plurality of bypass current setpoints.

15. A method of current management for a digital logic circuit, the method comprising:
    drawing power to drive a digital logic integrated circuit;
    determining a priori information about an impending current need of the digital logic integrated circuit;
    controlling a bypass current in parallel with the digital logic integrated circuit based on the a priori information, wherein the bypass current is controlled to reduce discontinuities in the current supplied by a power supply; and
    adjusting the bypass current to prevent the voltage of the digital logic integrated circuit from dropping below a reference voltage.

16. The method of claim 15, wherein when the a priori information identifies a first logic function of one or more logic functions, the method further comprises:
    correlating the first logic function with an associated bypass current setpoint.

17. The method of claim 16, wherein controlling a bypass current further comprises one or both of:

ramping the bypass current to the associated bypass current setpoint; and when the impending current need of the digital logic integrated circuit is completed, ramping the bypass current from an expected switching value to a steady state value.

18. The method of claim 17, wherein the digital logic integrated circuit comprises an input buffer stage adapted to receive digital logic input data, a logic function stage adapted to perform one or more logic operations based on the digital logic input data, and a power driver stage adapted to output digital data based on the one or more logic operations performed by the logic function stage, the method further comprising:

receiving a first signal from the input buffer stage, wherein the bypass current is ramped to the associated bypass current setpoint based on the first signal;

resetting the bypass current to a steady state level based on a second signal received from the logic function stage; and receiving a third signal from the power driver stage, wherein the bypass current is ramped from the associated bypass current setpoint to the steady state level based on the third signal.

19. The method of claim 16, wherein limiting the bypass current to prevent the voltage of the digital logic integrated circuit from dropping below the reference voltage further comprises:

limiting the bypass current based on the associated bypass current setpoint.

20. The method of claim 15, wherein when the voltage of the digital logic integrated circuit drops below a minimum guaranteed operating voltage of the digital logic integrated circuit, the method further comprising one or both of:

executing a test phase test routine; and
setting an alarm flag.

21. A current management system for a digital logic integrated circuit, the system comprising:

means for controlling a bypass current, the means for controlling adapted to control the bypass current based on a priori information about an impending current need of a digital logic integrated circuit, wherein the bypass current is controlled to reduce discontinuities in a current supplied to the digital logic integrated circuit;

means for drawing the bypass current, the means for drawing the bypass current connected electrically in parallel with the digital logic integrated circuit and responsive to the means for controlling; and means for limiting the bypass current to prevent a voltage powering the digital logic integrated circuit from dropping below a reference voltage, the means for limiting responsive to the means for controlling.

22. The system of claim 21, further comprising:

means for correlating a first logic operation of one or more logic operations performed by the digital logic integrated circuit with a first bypass current setpoint of the one or more bypass current setpoint, the means for correlating responsive to the digital logic integrated circuit.

23. The system of claim 21, further comprising:

means for comparing the voltage powering the digital logic integrated circuit with a reference voltage, the means for limiting responsive to the means for comparing.

24. The system of claim 23, further comprising:

means for learning one or more bypass current setpoints, the means for learning responsive to the means for comparing.

* * * * *